INVENTOR
DUANE B. HAAGENSEN

BY Elmer J. Gorn
ATTORNEY

May 29, 1956 D. B. HAAGENSEN 2,748,277

MAGNETRON NOISE GENERATORS

Filed Nov. 23, 1951 2 Sheets-Sheet 2

INVENTOR
DUANE B. HAAGENSEN
BY Elmer J. Gorn
ATTORNEY

United States Patent Office 2,748,277

Patented May 29, 1956

2,748,277

MAGNETRON NOISE GENERATORS

Duane B. Haagensen, Wayland, Mass., assignor to Raytheon Manufacturing Company, Newton, Mass., a corporation of Delaware Application November 23, 1951, Serial No. 257,830

6 Claims. (Cl. 250—36)

This application relates to oscillation generation devices and more particularly to oscillation generation systems using grid-controlled magnetrons. In copending application, No. 233,634, filed June 26, 1951, by Percy L. Spencer, there is disclosed a magnetron oscillator whose output power may be controlled by means of a grid or auxiliary electrode structure positioned adjacent the ends of the anode members nearest the cathode and substantially outside the paths of electron flow.

This invention discloses the discovery that a grid-controlled magnetron may be made to act as a high-frequency noise generator. Briefly, this is accomplished by applying to the grid or auxiliary electrode structure of the magnetron a constant frequency signal which is lower in frequency than the normal oscillation frequency of the magnetron, said constant frequency signal having an amplitude sufficient to produce substantial degeneration of the output of the magnetron at its normal oscillation frequency. Normal oscillation frequency, as used throughout the specification and claims, is defined as the oscillation frequency of the device in the absence of a signal applied to the grid or auxiliary electrode structure. The term "degeneration," as used throughout the specification and claims, is defined as the breaking down of the normal oscillation frequency into a wide range of spurious, substantially unrelated, noise signals.

Specifically, where the normal oscillation frequency of the magnetron is on the order of 2,000 megacycles, application of a constant frequency signal, lying in the range between 2 and 4 megacycles, will cause the output of the magnetron to have a spectrum centered around 2,000 megacycles, and in excess of 10 megacycles in width, made up substantially entirely of relatively uniformly distributed noise components. To accomplish this, the amplitude of the constant frequency signal should be sufficient to produce the desired degeneration of the normal oscillation frequency and may be, for example, on the order of several hundred volts R. M. S.

While the mechanics of the noise generation are not understood, several theories have been advanced which may be helpful in understanding this invention. A first explanation is that the magnetron oscillator is rapidly and repeatedly quenched by driving the grid sufficiently negative to cut off the oscillations. The oscillations are then started repeatedly at the input signal rate and at random phase with respect to the frequencies previously generated, hence producing a wide range of noise components. Another possibility is that oscillations may be occurring within the grid itself in a manner similar to a positive grid or Barkhousen oscillator. A still further theory is that the phenomenon is related to the excitation of the relatively high Q resonance within the magnetron by the heavy pulses of oscillation periodically generated by the magnetron. None of these theories, however, appears to adequately explain the noise generation.

Other and further objects and advantages of this invention will be apparent as the description thereof progresses, reference being had to the accompanying drawings wherein.

Figure 1:
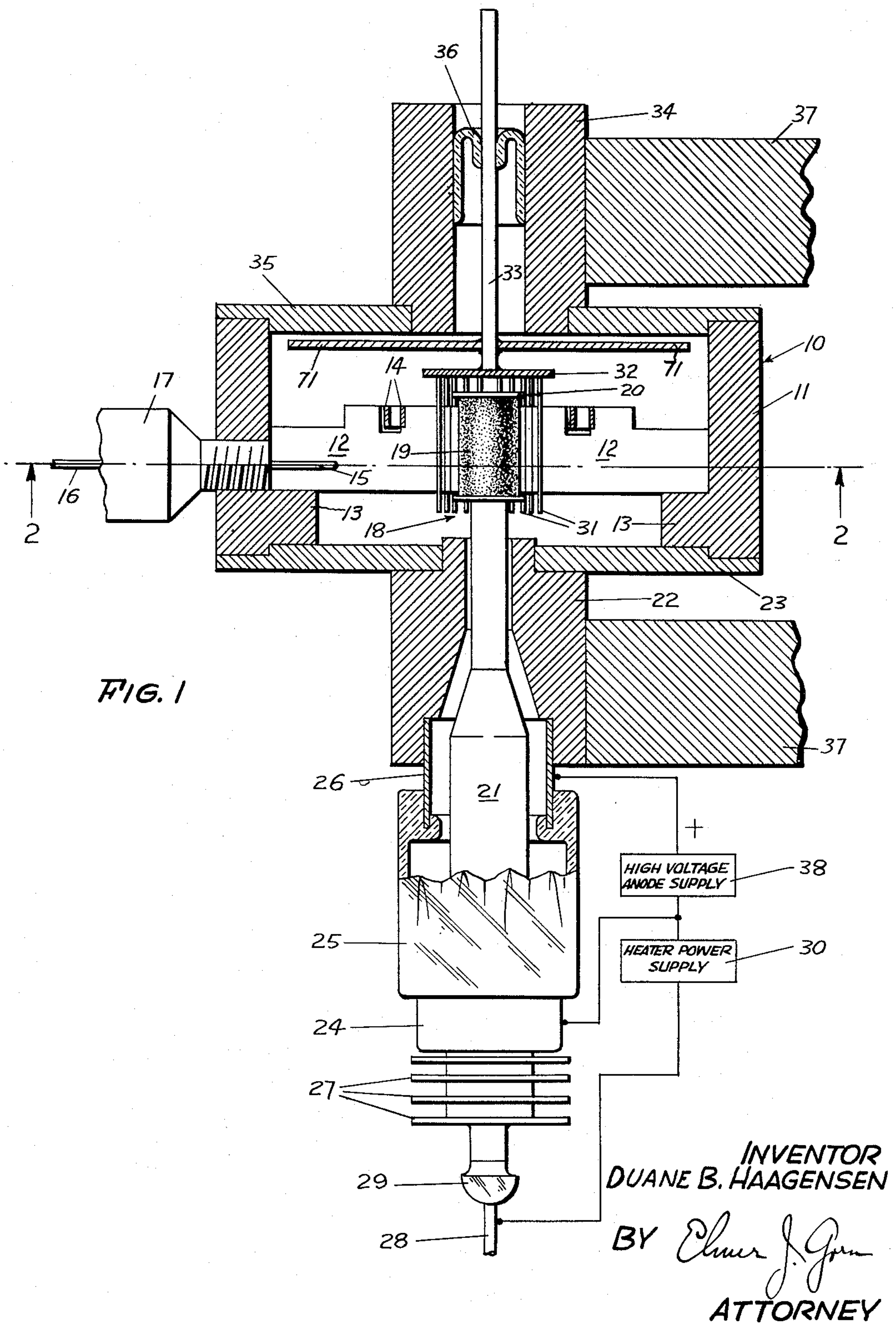
Fig. 1 illustrates a longitudinal, cross-sectional view of a type of grid-controlled magnetron which may be used in the noise generation system.
Figure 2:
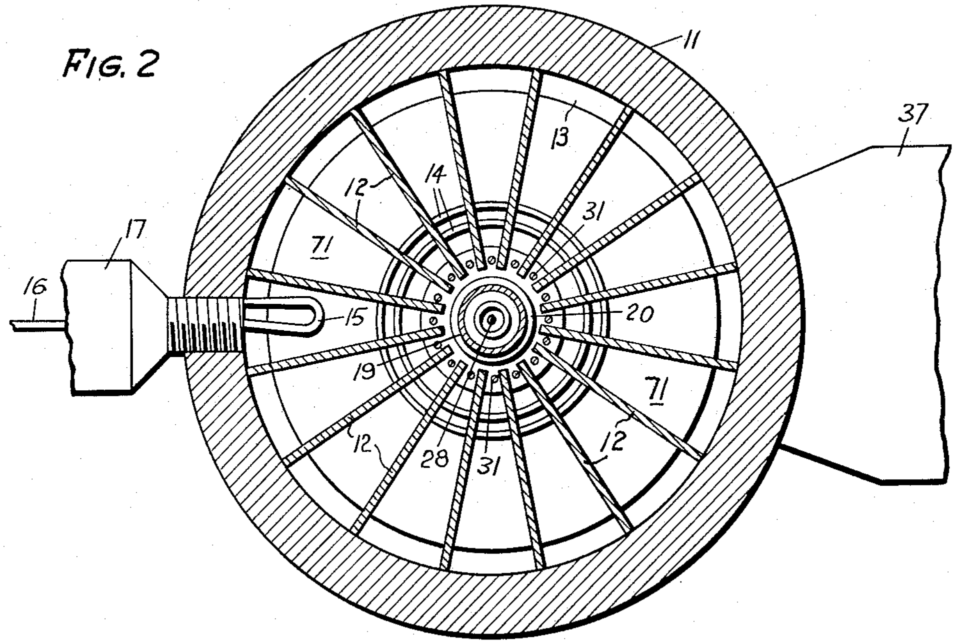
Fig. 2 illustrates a transverse, cross-sectional view of the device shown in Fig. 1, taken along the line of 2—2 of Fig. 1.

Referring now to Figs. 1 and 2, there is shown a magnetron anode structure 10 comprising an anode cylinder 11. Extending radially inwardly from the inner surface of anode cylinder 11, which is hollow, is a plurality of anode members 12, which are substantially planar rectilinear members whose planar surfaces lie substantially parallel to the axis of anode cylinder 11. A lip 13 is positioned on the inner surface of anode cylinder 11, below anode members 12, to aid in positioning said anode members during assembly of the device. Anode members 12 are alternately connected, adjacent their inner ends on their upper edges, by a pair of conductive straps 14, in a well-known manner.

Positioned in one of the cavities formed by anode members 12 and the space defined therebetween is an output coupling loop 15, one end of which is connected to the central conductor 16 of a coaxial cable which extends through an opening in anode cylinder 11. The outer conductor 17 of the coaxial cable is sealed to the opening in anode cylinder 11 into which conductor 16 passes. Central conductor 16 is insulatingly sealed to outer conductor 17 by any desired means, such as a ceramic seal, not shown.

Positioned inside the space defined by the inner ends of anode members 12 is a cathode structure 18 comprising a cathode cylinder 19 coaxial with anode cylinder 11. The outer surface of cathode cylinder 19 is coated with electron-emissive material, and the ends of cylinder 19 are covered by end shields 20. End shields 20 are in the form of discs slightly greater in diameter than cylinder 19. The purpose of end shields 20 is to prevent movement of electrons emitted from the surface of cylinder 19 along paths parallel to the axis thereof. Attached to the lower end shield 20 is a tubular support member 21. Tubular support member 21 extends downwardly from lower end shield 20 through an aperture in a lower magnetic pole piece 22 spaced therefrom. Lower magnetic pole piece 22 is sealed into the aperture in a lower cover plate 23 through which tubular support member 21 passes, cover plate 23, in turn, being hermetically sealed to the lower end of anode cylinder 11. After passage through lower magnetic pole piece 22, support member 21 is connected to a metallic cup 24 which, in turn, is sealed to a ceramic cylindrical member 25 surrounding support member 21. Ceramic cylinder 25 is, in turn, sealed to a metallic cylinder 26 surrounding support cylinder 21 spaced therefrom which, in turn, is sealed to lower magnetic pole piece 22. Cooling fins 27 are attached to support member 21 after passage through cup member 24 to increase the cooling of support member 21. Support member 21 also has positioned therein a conductive rod 28 which extends upwardly into cathode cylinder 19 where it is attached to one end of a heater coil, not shown, the other end of which is connected to anode cylinder 11. Rod 28 is insulatedly sealed to support member 21 by means of an insulating seal 29. Application of a heater voltage between the rod 28 and the support member 21, for example, by means of heater power supply 30, will produce a current flow through the heater coil in the cathode cylinder 19, thereby heating said cylinder to a temperature such that the electron emissive coating thereon will copiously emit electrons.

Positioned between each pair of anode members, adjacent their inner ends, is an auxiliary electrode or grid wire 31. Grid wires 31 are spaced from anode members 12 and are set back from the ring defined by the inner ends of anode members 12 by a few thousandths of an inch. Grid wires 31 are substantially parallel to the axis of anode cylinder 11, and are supported by connection at their upper ends to a conductive plate 32 positioned somewhat above upped end shield 20. Plate 32 is, in turn, rigidly connected to a conductive support rod 33 which extends upwardly through an upper magnetic pole piece 34 spaced therefrom. Upper magnetic pole piece 34 is sealed to an aperture in an upper end plate 35 through which conductive member 33 passes, end plate 35, in turn, being sealed to the upper end of anode cylinder 11. Conductive member 33 is insulatingly sealed to magnet pole piece 34 by means of a ceramic seal 36. A signal may be applied to the grid structure comprising the wires 31 by applying a signal between the support rod 33 and the cathode or anode structures. A magnetic field is produced between the magnet pole pieces 22 and 34 by means of a permanent magnet 37 whose poles are attached, respectively, thereto. A high voltage anode supply 38 is connected between the cathode structure and the anode structure whereby the device will oscillate at a frequency determined by the cavities defined by the anode members 12 and the spaces therebetween.

A disk 71 is attached to rod 33 above support disk 32 and below upper cover plate 35. The purpose of disk 71 is to prevent leakage of the microwave frequency generated by the magnetron, out through the aperture in upper pole piece 34, along the grid support rod 33. The capacity of disk 71 with respect to cover plate 35 is insufficient, however, to substantially bypass, to the anode structure, the 2–4 mc. signal applied to the grid structure from an external source.

Figure 3:
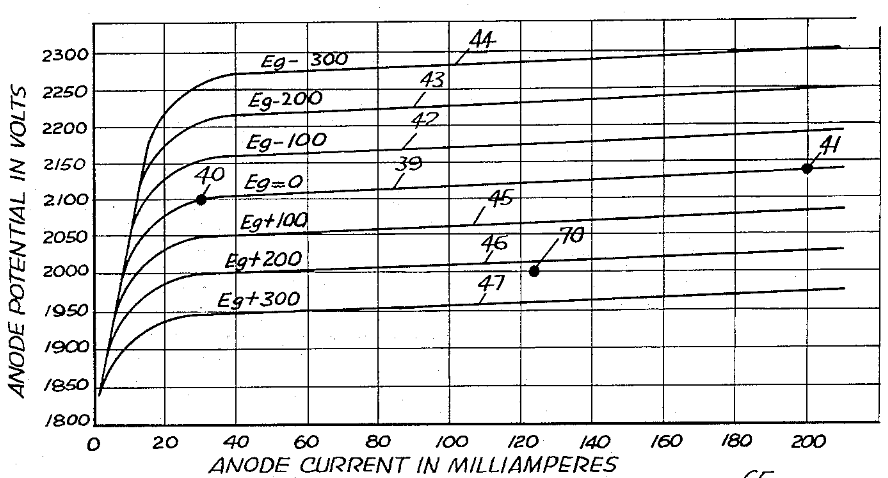
Fig. 3 illustrates a graph disclosing a set of operational curves for the device shown in Figs. 1 and 2.

Referring now to Fig. 3, there is shown a graph illustrating operational characteristics of the tube disclosed in Figs. 1 and 2. Plotted along the axis of ordinates is anode potential with respect to the cathode in volts. Plotted along the axis of abscissae is anode current in milliamperes. A curve 39 is illustrated therein for a potential of grid voltage equal to zero volts with respect to the cathode structure. This curve is substantially a straight line from a point at an anode current of 30 milliamperes, and an anode potential of 2,100 volts, as indicated by point 40 to a point 41 at an anode current of 200 milliamperes and an anode potential of 2,140 volts. Similarly, curves 42, 43, and 44 illustrate operating conditions for grid potentials of minus 100, minus 200, and minus 300 volts, respectively, with respect to cathode potential. The portions of curves 42, 43, and 44, between 40 and 200 milliamperes, lie substantially parallel to a similar portion of curve 39 but are more positive than curve 39 by potentials of substantially 55 volts and 165 volts, respectively. Similarly, curves 45, 46, and 47 represent operating curves, respectively, for grid voltages of plus 100, plus 200, and plus 300 volts with respect to cathode potential. The portions of these curves between 40 and 200 milliamperes lie substantially parallel to a similar portion of curve 39 at anode voltages which are less than the anode voltage of curve 39 by approximately 55 volts, 105 volts, and 155 volts, respectively. At anode currents below 30 milliamperes, the curves 39, 42 through 44, and 45 through 47 merge into each other as they approach 1,800 volts at zero current.

Figure 4:
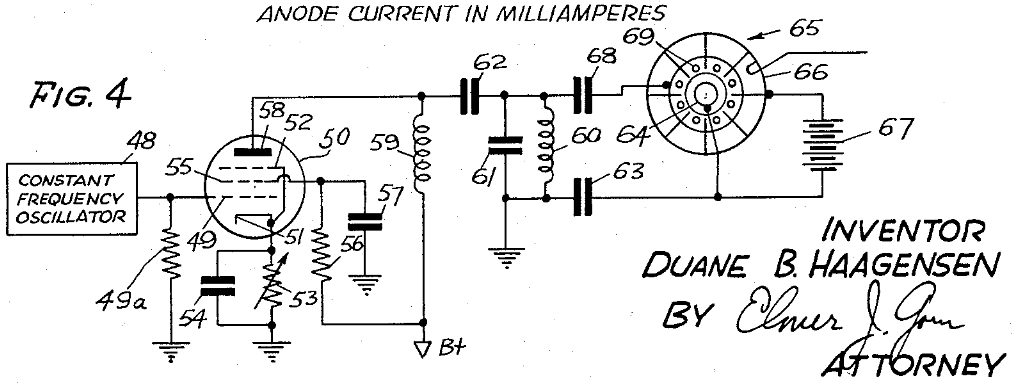
Fig. 4 illustrates a system in which the device of Figs. 1 and 2 may be used to produce noise generation.

Referring now to Fig. 4, there is shown a system in which the device of Figs 1 and 2 may be used. A constant frequency oscillator 48 is provided having a frequency substantially in the range between 2 and 4 megacycles. The output of oscillator 48 is fed to the grid 49 of an amplifier tube 50 which may be, for example, a type 6Ak5. Grid 49 is connected to ground through a grid load resistor 49*a*. The cathode 51 and suppressor grid 52 of tube 50 are connected together and are connected to ground through a cathode bias resistor 53 which is bypassed by a condenser 54. The screen grid 55 of tube 50 is connected to B plus through a voltage dropping and decoupling resistor 56, and to ground through a bypass condenser 57. The plate 58 of tube 50 is connected to B plus through a choke 59, and to one side of a tank circuit, comprising an inductor 60 and condenser 61 in parallel, through a coupling condenser 62. The other side of the tank circuit is connected to ground. The grounded side of the tank circuit is connected through a coupling condenser 63 to the cathode 64 of a grid-controlled magnetron 65, which may be of the type illustrated in Figs. 1 and 2, or of the type disclosed in the aforementioned copending application. A suitable potential is maintained between the cathode 64 of the magnetron 65 and the anode 66 thereof by means of a power supply 67, shown here diagrammatically, by way of example, as a battery. The ungrounded side of the tank circuit comprising inductor 60 and condenser 61 is connected through a coupling condenser 68 to the grid or auxiliary electrode structure 69 of the grid-controlled magnetron 65. The grid 69 is substantially insulated from the remaining components of the system for D. C. currents, and operates as a floating grid.

With the tank circuit comprising the inductor 60, and the condenser 61 tuned to the frequency of oscillator 48, the output of oscilator 48 is adjusted to a sufficient amplitude to cause degeneration of the normal oscillation frequency of the magnetron 65. It has been found that, with an anode potential, for example, of 2,000 volts, an anode current of approximately 125 milliamperes will occur. This point defines the average bias on the grid 69, and is illustrated on the graph of Fig. 3 as point 70. Point 70 lies intermedate curves 46 and 47, and by interpolation indicates that the grid 69 has an average potential with respect to cathode of around 225 volts. As may be seen from the graph, if a signal of 150 volts R. M. S. is applied to the grid 69, at the peak of the negative signal, the grid will have substantially a zero potential with respect to cathode, and it is believed that under these conditions the tube is no longer oscillating stably.

It may be that a peak signal greater than 225 volts is needed to produce the desired instability of oscillation which results in the wide band of noise generation. The amount of signal required for any particular tube and set of operating conditions is easily ascertained by merely increasing the amplitude of the signal drive until the phenomenon of normal oscillation frequency degeneration is encountered. If desired, provision for adjustment of the amplitude may be made by making cathode bias resistor 53 adjustable. It has been discovered that there is a time delay of a few seconds between the time that the signal is applied to the grid 69 and the degeneration of the normal oscillation frequency occurs. During the time delay the conventional modulation component comprising a carrier and wide bands produced are present in the output of the magnetron.

This completes the description of the particular embodiments of the invention described herein. However, many modifications thereof will be apparent to persons skilled in the art without departing from the spirit or scope of this invention.

For example, signals from any desired source, other than oscillator 48, may be fed to the grid 69. The particular grid structure could be modified to use any desired shape of grid members, and the support for the grid structure could be of any desired type. Accordingly, it is desired that this invention be not limited to the particular details illustrated herein, except as defined by the appended claims.

What is claimed is:

1. An electron discharge device system for generating noise comprising an evacuated envelope containing an electron source, a signal wave transmission network comprising a multiplicity of anode members adjacent ones of which at least partially define a plurality of cavity resonators resonant at a first frequency, means for directing electrons along paths adjacent said network, an auxiliary electrode positioned outside said paths, a tuned circuit resonant at a second frequency substantially lower than said first frequency coupled between said auxiliary electrode and said electron source, and means for supplying an external modulating signal of said second frequency to said auxiliary electrode.

2. An electron discharge device system for generating noise comprising an evacuated envelope containing an electron source, a signal wave transmission network comprising a multiplicity of anode members adjacent ones of which at least partially define a plurality of cavity resonators resonant at a first frequency, means for directing electrons along paths adjacent said network including means for establishing an electric field between said electron source and said network and means for producing a magnetic field in the region of said paths transverse to said electric field, an auxiliary electrode positioned outside said paths, a tuned circuit resonant at a second frequency substantially lower than said first frequency coupled between said auxiliary electrode and said electron source, and means for supplying an external modulating signal of said second frequency to said auxiliary electrode, said auxiliary electrode being substantially insulated for direct current from the remainder of the system.

3. An electron discharge device system for generating noise comprising an evacuated envelope containing an electron source, a signal wave transmission network comprising a multiplicity of anode members adjacent ones of which at least partially define a plurality of cavity resonators resonant at a first frequency, means for directing electrons along paths adjacent said network including means for producing a magnetic field in the region of said paths, an auxiliary electrode positioned outside said paths, a tuned circuit resonant at a second frequency substantially lower than said first frequency coupled between said auxiliary electrode and said electron source, and means for supplying an external modulating signal of said second frequency to said auxiliary electrode.

4. An electron discharge device system for generating noise comprising an evacuated envelope containing an electron source, a signal wave transmission network comprising a multiplicity of anode members adjacent ones of which at least partially define a plurality of cavity resonators resonant at a first frequency, means for directing electrons along paths adjacent said network including means for producing a magnetic field in the region of said paths, an auxiliary electrode positioned outside said paths, said auxiliary electrode being substantially incapable of electron emission, a tuned circuit resonant at a second frequency substantially lower than said first frequency coupled between said auxiliary electrode and said electron source, and means for supplying an external modulating signal to said auxiliary electrode.

5. An electron discharge device system for generating noise comprising an evacuated envelope containing an electron source, a signal wave transmission network comprising a multiplicity of anode members adjacent ones of which at least partially define a plurality of cavity resonators resonant at a first frequency, means for directing electrons along paths adjacent said network including means for producing a magnetic field in the region of said paths, an auxiliary electrode positioned outside said paths, said auxiliary electrode being substantially incapable of electron emission, a tuned circuit resonant at a second frequency substantially lower than said first frequency coupled between said auxiliary electrode and said electron source, and means for supplying an external modulating signal of said second frequency to said auxiliary electrode.

6. An electron discharge device system for generating noise comprising an evacuated envelope containing an electron source, a signal wave transmission network comprising a multiplicity of anode members adjacent ones of which at least partially define a plurality of cavity resonators resonant at a first frequency, means for directing electrons along paths adjacent said network including means for establishing an electric field between said electron source and said network and means for producing a magnetic field in the region of said paths transverse to said electric field, an auxiliary substantially non-electron emmissive electrode positioned outside said paths, said auxiliary electrode being substantially insulated for direct current from the remainder of the system, a tuned circuit resonant at a second frequency substantially lower than said first frequency coupled between said auxiliary electrode and said electron source, and means for supplying an external modulating signal whose frequency is maintained at said second frequency to said auxiliary electrode.

References Cited in the file of this patent

UNITED STATES PATENTS

| | | |
|---|---|---|
| 2,152,035 | Fritz et al. | Mar. 28, 1939 |
| 2,217,745 | Hansell | Oct. 15, 1940 |
| 2,446,531 | Derby | Aug. 10, 1948 |
| 2,468,127 | Smith | Apr. 26, 1949 |
| 2,504,739 | Shoupp | Apr. 18, 1950 |